Patented Dec. 15, 1925.

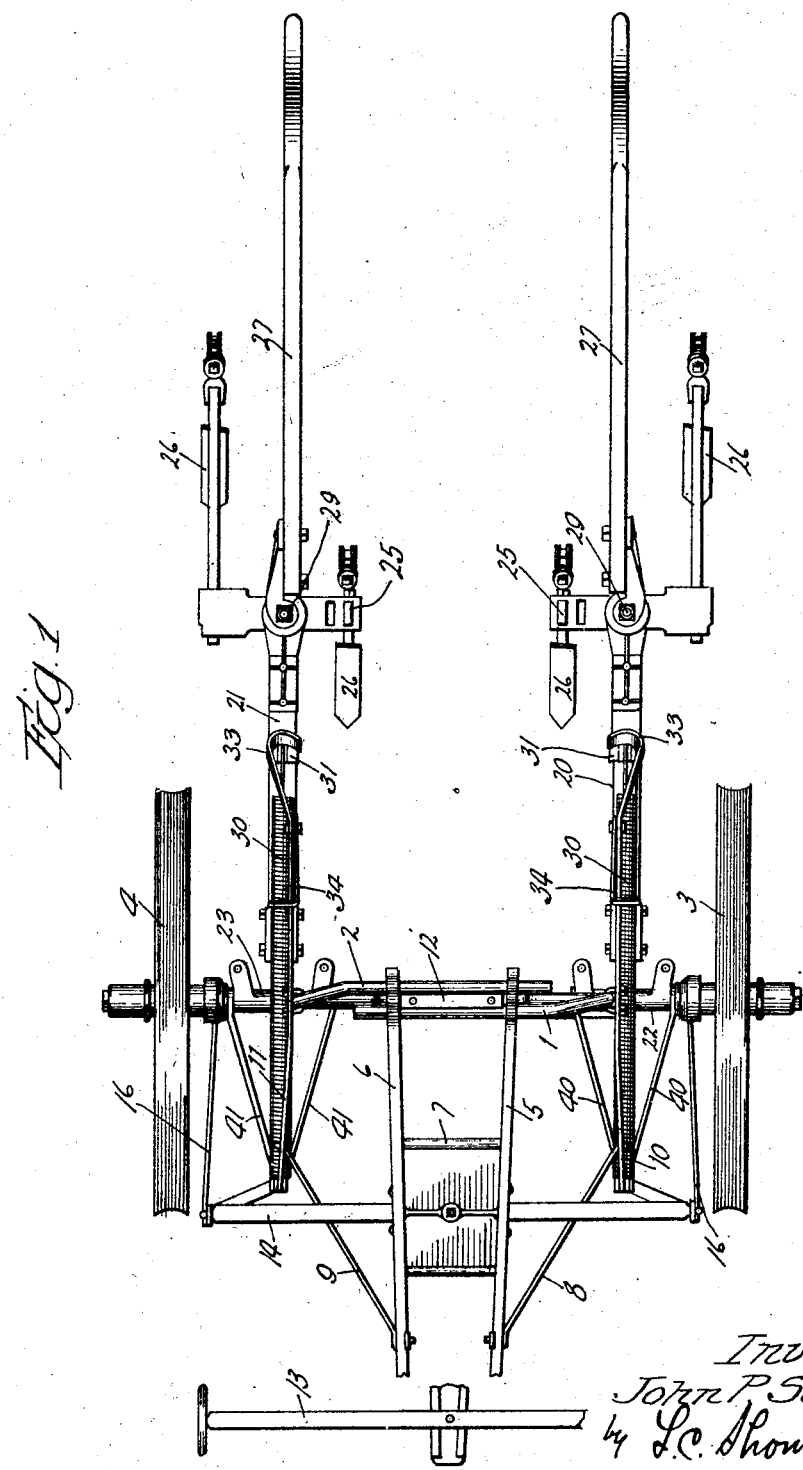

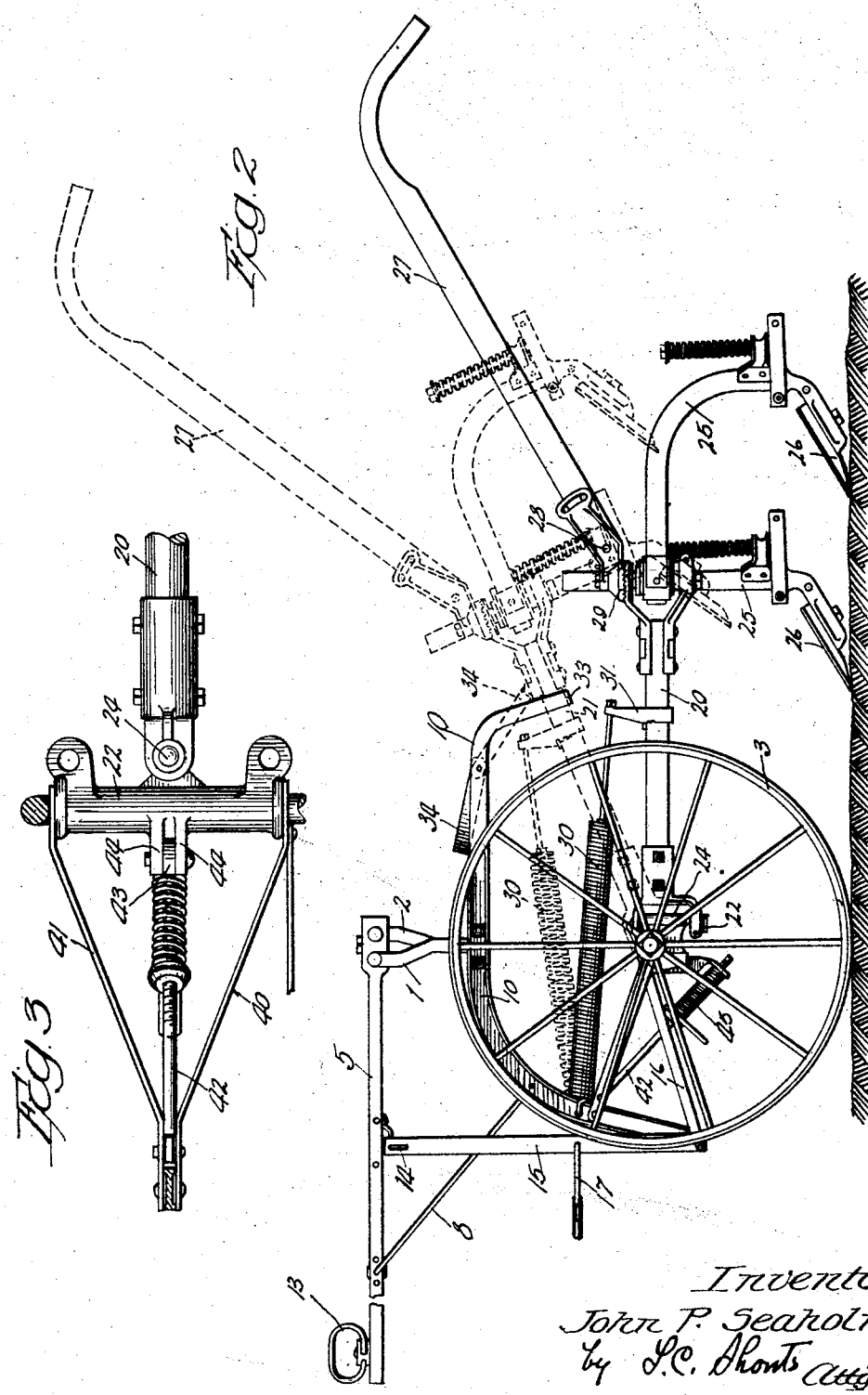

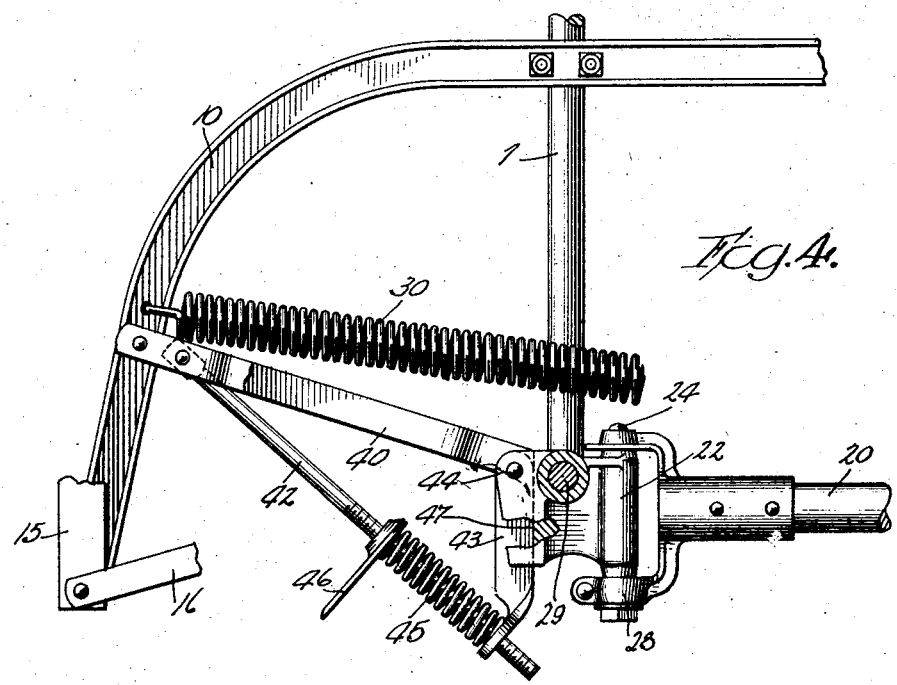
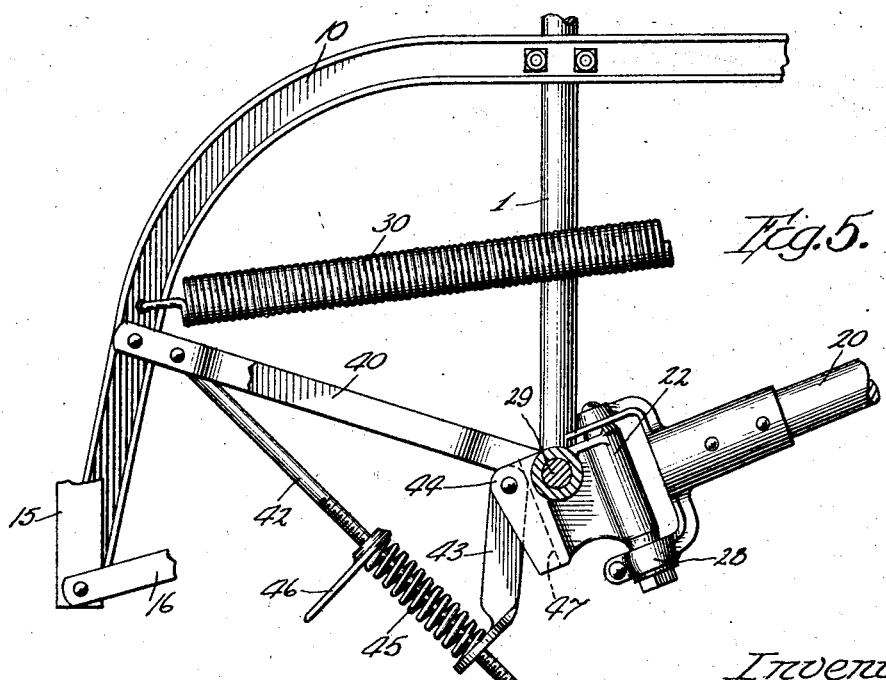

1,565,594

UNITED STATES PATENT OFFICE.

JOHN P. SEAHOLM, OF MOLINE, ILLINOIS, ASSIGNOR, BY MESNE ASSIGNMENTS, TO MOLINE IMPLEMENT COMPANY, A CORPORATION OF ILLINOIS.

CULTIVATOR.

Application filed September 22, 1922. Serial No. 589,778.

*To all whom it may concern:*

Be it known that I, JOHN P. SEAHOLM, a citizen of the United States, residing at Moline, county of Rock Island, State of Illinois, have invented certain new and useful Improvements in Cultivators, of which the following is a specification.

The invention relates to cultivators.

It relates particularly to improvements on the cultivator shown in my co-pending application, Serial No. 535,127, filed February 9, 1922.

In the cultivator of the prior application, a single spring is employed for biasing the cultivator drag bar to the right or left of its normal position, for supplying the balancing force to make it easy for the operator to raise the drag bar and for providing an adjustable yielding stop for determining the working position of the drag bars, and at the same time permitting them to be forced to a deeper working position when desired.

The present invention relates to a modification of this construction in which one of the functions of this spring is eliminated and performed by a separate mechanism.

The general object of the invention is to provide an improved cultivator.

A more specific object is to provide an improved mechanism, which provides a yielding and adjustable support for determining the working position of the drag bars and for permitting them to be temporarily pressed downward to permit the cultivator to work deeper.

Other objects and advantages of the invention will appear from the specification and drawings.

An embodiment of the invention is illustrated in the drawings in which,

Figure 1 is a plan view of the cultivator.

Figure 2 is a side elevation showing one of the cultivator drag bars in full lines in working position and in dotted lines in raised position.

Figure 3 is a plan view of the connection of the drag bars to the cultivator axle.

Figure 4 is a detailed side elevation of a portion of the mechanism showing the parts in the position they occupy when the drag bar is lowered and in working position.

Figure 5 is a view similar to Figure 4 with the drag bar in raised position.

The cultivator is provided with two crank axles 1 and 2 carrying supporting wheels 3 and 4. The inner ends of the crank axles extend through openings in tongue members 5 and 6 which are connected together by a tool box 7 and which converge forwardly forming a tongue. The tongue is braced to the crank axles by means of braces 8 and 9, which are connected to side members 10 and 11, the latter serving to perform several functions in addition to their bracing action, as will be hereinafter described. The crank axles may be adjusted to and from one another to vary the width of tread of the cultivator by loosening the clamp 12 and adjusting the axles to suit the requirements. A neck yoke 13 is connected to the forward end of the tongue.

It will be noted that this construction provides a cultivator in which the crank axles and tongue together with the bracing members act as a frame. Each of the parts have been so constructed and all of them have been so coordinated that the maximum number of functions is performed by a minimum number of parts.

The mechanism for transmitting the draft of a team to the cultivator includes a bar 14 connected to the tool box 7, from each end of which depends links 15, the lower ends of which are connected by braces 16 to the cultivator axles. The side members 10 and 11 are flared outwardly at their forward ends and attached to the lower ends of the links 15. The swingle trees are connected to the links 15 by connections 17, as illustrated in Figure 2.

The cultivating tools are carried by drag bars 20 and 21, which are connected to the crank axles by means of drag bar supports 22 and 23. Each drag bar is pivoted to its support on a vertical axis 24, which permits it to swing in a horizontal plane. Each drag bar support is journaled on its crank axle, so that it may swing about a horizontal axis. The drag bars may thus be moved sidewise, or up and down.

The drag bars carry standards 25 supporting shovels 26. Each drag bar is provided with a handle 27 adjustable about a horizontal axis 28 and about a vertical axis 29. The handles may thus be adjusted to suit the requirements of the operator and by means of these handles, the drag bars with their cultivator shovels may be moved to their desired positions in cultivating.

The working and non-working position of the drag bars is illustrated in Figure 2. When the drag bar is in its working position illustrated in full lines, the spring 30, which is connected at its forward end to the brace 10 and at its rear end to an adjustable connecting member 31 is under tension, which is sufficient to very nearly balance the weight of the drag bar and its associated parts. When the operator desires to raise the drag bar to the non-working position, shown in dotted lines, this spring assists in the raising operation and makes it a very easy matter to lift the drag bars. It is merely necessary for the operator to exert a slight raising force on the drag bar handles 27 when they are in the full line position to move them upward slightly. As soon as the movement begins, the effective leverage of the springs 30 increases and, since the tension of these springs is about sufficient to balance their drag bars when in working position, it becomes more than sufficient to balance them as the drag bars are raised.

The drag bars are supported in raised position by means of the hooks 33 formed by the bent ends of the braces 10 and 11. They are locked in raised position by means of latches 34, which may be swung from the full line to the dotted line position as shown.

The spring 30 has an additional function, namely, that of biasing the drag bars to the right or left from their normal position whenever they are moved from that position. It is frequently necessary, in cultivating, to push the cultivator shovels to the right or left, either because the cultivator and the team drawing it are not in exactly the right position, or because the plants being cultivated may be out of line at various points. It requires considerable force to hold the cultivator shovels to the side of the line of draft, because they must be so held against the draft that is being exerted, which normally tends to bring the shovels back to the center line of resistance. In the present cultivator, the springs 30 serve to assist the operator in holding the shovels to the side of the line of draft after he has moved them to one side. This action is automatic and does not affect the normal operation of the machine.

The forward connection of the spring 30 is ahead of the pivot point of the drag bar to the crank axle. The spring passes directly over the pivot of the drag bar to the crank axle and is connected to the drag bar to the rear of the pivot. When the parts are in line, as shown in Figure 1, the spring 30 is directly over the pivot of the drag bar to the crank axle and no force is exerted by the spring to move the drag bar to one side or the other. As soon, however, as the drag bar is moved to the right or left the spring 30 exerts a biasing action, which increases as the drag bar moves to one side. This action increases, because, as the drag bar moves sidewise, the effective leverage of the spring increases. This results in the application of the greatest force of the spring at the point where it is demanded, that is, when the drag bar must be held to a considerable distance at one side, the force of the spring in assisting in holding it is great and when the drag bar must be held only a small amount to one side, the force of the spring is relatively small. This action of the spring may be raised by adjusting the connection 41 to move the point of connection of the spring to one side or the other.

The present invention relates particularly to a mechanism for yieldingly and adjustably stopping the downward movement of the drag bars so as to determine their working position.

Connecting the brace 10 with the crank axle 1 is a pair of braces 40 and 41 to the forward end of which is connected a link 42 that extends loosely through an opening in a second link 43 pivoted between lugs 44 on the forward end of the drag bar support 22. A spring 45 surrounds the lower end of the link 42, one end of the spring bearing against the link 43 and the other against an adjustable stop 46. When the drag bar is raised, the parts occupy the position shown in Figure 5, in which position the mechanism is inactive.

When the drag bar is lowered, the bottom 47 of the slot between the lugs 44 strikes the link 43 and moves it against the tension of spring 45. The extent of this movement is, of course, determined by the adjustment of the stop 46, which is threaded to the link 42 and may be easily and quickly turned to any desired position. This limits the downward movement of the drag bar and permits the point at which the drag bar is stopped to be readily adjusted. It is necessary, however, for the operator to occasionally press the cultivator shovels deeper into the ground. This may be done in the mechanism shown by simply applying force to the drag bar handles. The spring 45 will yield sufficiently to permit the cultivator shovels to be forced deeper into the ground, but as soon as pressure is relieved on the handles, it will return the parts to their normal position.

This mechanism is both simple and convenient and it serves to provide a yieldable stop that permits the shovels to be forced into the ground when desired. It, furthermore, does not interfere with the raising of the drag bars. If the spring 45 were connected directly to some of the parts, it would be placed under tension when the drag bars were raised. In the present invention, however, when the drag bars are raised, the support 22 is simply removed from contact with the stop and the drag bars and associated mechanism are free to operate without any interference from the stop.

It is to be understood that the construction shown is for purposes of illustration only and that variations may be made in it without departing from the spirit and scope of the invention.

I claim:

1. In a cultivator having a framework and an axle, a drag bar support pivoted to the axle, a drag bar connected to said support on one side of the axle, and a resilient stop connected to the support on the other side of the axle, said stop including a link pivoted to the drag bar and extending downwardly so that, in one position of the drag bar support, the latter contacts the link to move it bodily with the support, and resilient means interposed between the link and a portion of the cultivator framework to oppose motion of the link when it is contacted by the drag bar support to fix the normal position of the support but serving to permit it to be moved beyond its normal position when it is desired to temporarily cultivate deeper.

2. In a cultivator, an axle, a drag bar support pivoted to the axle, a drag bar connected to said support on one side of the axle, a resilient stop co-operating with the support on the other side of the axle, said stop including a link pivoted between arms on the support and positioned so as to be contacted by the support when the drag bar is lowered, a spring contacting the link, and means for adjusting the tension of the spring to vary the effective action of the stop.

3. In a cultivator, an axle, a drag bar support pivoted to the axle, a drag bar pivoted to the support on one side of the axle, a yielding stop connected to the support on the other side of the axle, said stop including a link pivoted to the drag bar support, a second link extending loosely through an opening in the first, and a spring between the end of the first link and an adjustable stop on the second link.

4. A cultivator having a frame work including arched axles on which ground wheels are journalled, a drag bar support pivoted to one of the crank axles, a drag bar connected to the rear side of said support, a link pivoted between ears on the forward side of said support and extending downwardly, a second link pivoted at its forward end to the cultivator frame work and loosely connected with the first link at its lower end, a spring surrounding the second link and contacting the first link, and an adjustable stop carried by the second link against which said spring abuts.

In testimony whereof, I affix my signature.

JOHN P. SEAHOLM